(12) United States Patent
Cuero Rengifo et al.

(10) Patent No.: US 9,617,176 B2
(45) Date of Patent: Apr. 11, 2017

(54) COMPOSITIONS FOR WATER TREATMENT AND METHODS OF USING THEREOF

(71) Applicant: AGUAS DE MANIZALES S.A. E.S.P., Manizales (CO)

(72) Inventors: Raul Cuero Rengifo, Cypress, TX (US); Juliana Londono Murillo, Chinchina Caldas (CO)

(73) Assignee: AGUAS DE MANIZALES S.A. E.S.P., Manizales (CO)

(*) Notice: Subject to any disclaimer, the term of this patent is extended or adjusted under 35 U.S.C. 154(b) by 33 days.

(21) Appl. No.: 14/288,419

(22) Filed: May 28, 2014

(65) Prior Publication Data
US 2014/0353257 A1 Dec. 4, 2014

Related U.S. Application Data

(60) Provisional application No. 61/828,376, filed on May 29, 2013.

(51) Int. Cl.
| | | |
|---|---|---|
| C02F 5/02 | (2006.01) | |
| C02F 5/08 | (2006.01) | |
| C02F 1/52 | (2006.01) | |
| B01D 21/01 | (2006.01) | |

(52) U.S. Cl.
CPC .......... *C02F 1/5263* (2013.01); *C02F 1/5245* (2013.01); *C02F 2303/04* (2013.01)

(58) Field of Classification Search
CPC .. C02F 9/00; C02F 1/56; C02F 1/5245; C02F 1/5263; C02F 2303/04; C02F 1/5272; C02F 2103/10; C02F 5/02; C01F 7/0653; B01D 21/00; B01D 21/01
USPC ................ 210/702, 723, 724, 727–731, 738; 252/175, 176, 178, 180, 181
See application file for complete search history.

(56) References Cited

U.S. PATENT DOCUMENTS

| | | | | |
|---|---|---|---|---|
| 4,128,477 A | * | 12/1978 | Nebolsine | C02F 1/5236 210/170.06 |
| 5,336,415 A | * | 8/1994 | Deans | 210/725 |
| 5,393,435 A | | 2/1995 | Deans et al. | |
| 5,730,876 A | * | 3/1998 | You | C08B 37/003 127/34 |
| 6,177,047 B1 | | 1/2001 | Kuczynski et al. | |
| 7,157,009 B2 | | 1/2007 | Nichols et al. | |
| 7,601,211 B2 | | 10/2009 | Yoon et al. | |
| 7,790,042 B2 | * | 9/2010 | Nichols et al. | 210/721 |
| 8,119,011 B1 | * | 2/2012 | Nyman et al. | 210/725 |
| 8,637,090 B2 | | 1/2014 | Ohtake et al. | |
| 8,691,288 B2 | | 4/2014 | Myntti | |
| 2006/0018945 A1 | * | 1/2006 | Britigan | A01N 59/16 424/423 |
| 2007/0281904 A1 | * | 12/2007 | Baker | A61L 2/232 514/55 |
| 2008/0241247 A1 | * | 10/2008 | Marais | C02F 1/50 424/486 |
| 2011/0000854 A1 | | 1/2011 | Nichols et al. | |
| 2012/0145645 A1 | | 6/2012 | Wietholter et al. | |
| 2012/0325740 A1 | | 12/2012 | Kruglick | |

FOREIGN PATENT DOCUMENTS

| | | |
|---|---|---|
| EP | 2712614 | 5/2007 |
| WO | 9937584 | 7/1999 |
| WO | 0200557 | 1/2002 |
| WO | 03011769 | 2/2003 |
| WO | 03042251 | 5/2003 |
| WO | 03099729 | 12/2003 |
| WO | 2004071961 | 8/2004 |
| WO | 2008097317 | 8/2008 |
| WO | 2011005354 | 1/2011 |
| WO | 2011034327 | 3/2011 |
| WO | 2011156097 | 12/2011 |
| WO | 2012112136 | 8/2012 |

OTHER PUBLICATIONS

Aluminium in Drinking-water: Background document for development of WhO Guidelines for Drinking-water Quality. World Health Organization. File created Oct. 23, 2003. Accessed Apr. 8, 2013. (Originally published in Guidelines for drinking-water quality, 2nd ed. Addendum to vol. 2. Health criteria and other supporting information. World Health Organization, Geneva, 1998.).
ChromoCult Coliform Agar: For Detection of Coliforms in Drinking Water and Processed Food Samples. Merck. File created Nov. 26, 2014. Accessed Apr. 4, 2013.
HaloKlear BHR-P25 Product Information Sheet. Halosource, Inc. File created Oct. 11, 2012 (accessed Apr. 4, 2013).
HaloKlear BHR-P50 Product Information Sheet. Halosource, Inc. File created Oct. 11, 2012 (accessed Apr. 4, 2013).
HaloKlear LMF-3001 Product Information Sheet. Halosource, Inc. File created Oct. 11, 2012 (accessed Apr. 4, 2013).
Halosource MSDS for HaloKlear: BHR-P25. Revision 00. Halosource, Inc. Jun. 22, 2012 (accessed Apr. 4, 2013).
Halosource MSDS for HaloKlear: BHR-P50. Revision 01. Halosource, Inc. Aug. 30, 2012 (accessed Apr. 4, 2013).
Halosource MSDS for HaloKlear: LMF-3001. Revision 00. Halosource, Inc. Sep. 27, 2011 (accessed Apr. 4, 2013).
International Search Report and Written Opinion for PCT/US2014/039642 dated Oct. 3, 2014.
Kaneko et al. "The transition metal gallium disrupts Pseudomonas aeruginosa iron metabolism and has antimicrobial and antibiofilm activity." J. Clin. Invest. 2007. 117:877-888.

* cited by examiner

*Primary Examiner* — Nam Nguyen
*Assistant Examiner* — Claire Norris
(74) *Attorney, Agent, or Firm* — Gardner Groff Greenwald & Villanueva, PC

(57) ABSTRACT

Described herein are compounds and compositions useful for removing contaminants from water, as well as methods for making and using the compounds and compositions. In one aspect, the compositions contain a source of gallium ions and a polysaccharide such as chitosan, which are inexpensive and safe for the environment.

17 Claims, No Drawings

COMPOSITIONS FOR WATER TREATMENT AND METHODS OF USING THEREOF

CROSS REFERENCE TO RELATED APPLICATION

This application claims priority upon U.S. Provisional Application Ser. No. 61/828,376, filed May 29, 2013. The application is hereby incorporated by reference in its entirety for all of its teachings.

BACKGROUND

Many commercial processes generate wastewater and/or lead to contamination of groundwater, lakes, streams, and rivers. Mine tailings such as slurry contain a large proportion of water, and cooling waters for blast furnaces used in iron and steel processing are often contaminated with polycyclic aromatic hydrocarbons, ammonia, cyanide, acids, iron, and related chemical species. The chemical industry produces large amounts of wastewater that may be contaminated with intermediates from chemical synthesis, plasticizers, and end products including pharmaceuticals, pesticides, and the like. Water from agriculture and the food processing industry can contain large amounts of organic matter as well as potentially harmful microbial species such as those found in the intestinal tracts of animals slaughtered for meat. Additionally, municipal wastewater may contain microorganisms, detergents, surfactants, trace pharmaceuticals, and other contaminants. Further, wastewater must either be stored, which can be expensive and can require a great deal of space, or else it must be processed so that it is safe prior to discharging it back into the environment.

Contaminants in wastewater can negatively impact human health. As more livestock animals are treated prophylactically with antibiotics, antibiotic-resistant bacteria are becoming more common. These may find their way into the water supply via faulty processing at meat-packing plants. Antibiotic resistance is a serious threat to public health and is responsible for many hospitalizations and deaths each year. Water-borne pathogens, on the other hand, are especially problematic in developing countries without adequate sanitation and/or water treatment facilities, as well as in remote areas where residents must rely on well water for drinking, washing, and cooking. Other contaminants in water supplies include carcinogens (e.g. pesticides, plasticizers, polycyclic aromatic hydrocarbons), heavy metals, and endocrine disruptors; these are responsible for a wide range of health problems in both humans and domestic animals. Even absent the aforementioned contaminants, particulate matter can render drinking water cloudy and can interfere with the taste and smell of the water. Further, dissolved organic material can provide nutrients to algae and other aquatic microorganisms, thus leading to toxic algae blooms, which prevent recreational use of waters and which can cause harm to fish and other seafood populations.

A variety of devices designed to purify water are already on the market for home user. These include filters for refrigerators, taps, water pitchers, and the like, as well as whole-house systems that make use of ultraviolet disinfection, reverse osmosis, and related techniques. However, these devices are often expensive to install, require costly replacement parts at regular intervals, and are not practical solutions to water quality problems in areas that lack municipal water supplies and/or consistent and reliable sources of electricity.

Various methods of treating municipal water, well water, and wastewater are known in the art. For example, chlorine and/or iodine tablets can be used to disinfect small amounts of water for personal use. While effective at killing bacteria, these tablets do not remove heavy metals, organic matter, or particulate matter from water. Further, depending on the mineral content of the water, chlorine- and iodine-based disinfection can lead to discoloration and/or taste changes that make the treated water unpalatable.

Several polymeric systems have been proposed as flocculants or clarifying agents to be used in water treatment. However, these often have undesirable side effects. For example, metal ion/polysaccharide systems containing silver ions may not be desirable for treatment of drinking water due to expense and to the tendency of silver ions to bioaccumulate, causing skin discoloration and even silver poisoning. Aluminum-containing coagulants may contribute to developmental and/or neural toxicities, especially in acidic environments. Other polymer-based water purification systems require numerous additional components such as clays, chlorine-based disinfectants, pH-altering ingredients, metal salts, and the like. The high number of ingredients or components in such systems increases the expense associated with water purification as well as the required skill level of the worker performing the purification. Additionally, some polymers used in water-purification processes suffer from solubility problems or are required in high amounts to be effective.

It would thus be desirable to develop an inexpensive, safe, and easy-to-use system for purifying well water, municipal water supplies, and/or wastewater.

SUMMARY

Described herein are compounds and compositions useful for removing contaminants from water, as well as methods for making and using the compounds and compositions. The compositions contain a source of gallium ions and a polysaccharide, which are inexpensive and safe for the environment. In one aspect, the methods described herein include contacting contaminated water with the source of gallium ions and polysaccharide, allowing floccules or precipitates containing contaminants to form, and separating the floccules or precipitates from the water.

The advantages of the invention will be set forth in part in the description that follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

DETAILED DESCRIPTION

Before the present compounds, compositions, articles, devices, and/or methods are disclosed and described, it is to be understood that the aspects described below are not limited to specific compounds, synthetic methods, or uses, as such may, of course, vary. It is also to be understood that the terminology used herein is for the purpose of describing particular aspects only and is not intended to be limiting.

In this specification and in the claims that follow, reference will be made to a number of terms that shall be defined to have the following meanings:

It must be noted that, as used in the specification and appended claims, the singular forms "a," "an," and "the" include plural referents unless the context clearly dictates otherwise. Thus, for example, reference to "a polysaccharide" includes mixtures of two or more polysaccharides.

"Optional" or "optionally" means that the subsequently described event or circumstance can or cannot occur, and that the description includes instances where the event or circumstance occurs and instances where it does not. For example, the phrase "optionally treated by an additional water purification technique" means that an additional water purification technique can or cannot be performed.

As used herein, the term "about" is used to provide flexibility to a numerical range endpoint by providing that a given value may be "a little above" or "a little below" the endpoint without affecting the desired result. Ranges may be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint and independently of the other endpoint.

"Admixing" or "admixture" refers to a combination of two or more components together wherein there is no chemical reaction or physical interaction. The terms "admixing" and "admixture" can also include the chemical reaction or physical interaction between any of the components described herein upon mixing to produce the composition. The components can be admixed alone, in water, in another solvent, or in a combination of solvents.

"Wastewater" as used herein is contaminated water, wherein the contamination results directly or indirectly from human activity. "Contaminants" include, but are not limited to, microorganisms and their spores, detergents and surfactants, fertilizers, heavy metals, oil or petroleum, pharmaceuticals and other organic compounds, pesticides, oils used for cooking or lubricating, biodegradable waste, high levels of acid or alkali, sewage, byproducts of industrial processes, and the like.

"Coliform bacteria" are rod-shaped, Gram-negative, non-spore-forming bacteria. They can be found in water, on plants, in the intestinal tracts of warm-blooded animals, in soil, and in other places, and are capable of fermenting lactose. The presence of coliform bacteria in a food or water sample is often used as an indicator that other microorganisms of fecal origin, including pathogenic microorganisms, may be present in the sample. Genera of coliform bacteria include *Escherichia, Salmonella, Citrobacter, Enterobacter, Klebsiella, Serratia*, and *Hafnia*. "Fecal coliform" bacteria are those coliform bacteria specifically associated with the feces of warm-blooded animals and include organisms such as, for example, *Escherichia coli*.

As used herein, "colony forming units" or "CFUs" are estimates of the numbers of viable bacterial or fungal cells in a sample. In order to determine the CFU count of a sample, the sample is introduced to a petri dish by any one of a number of methods known in the art. The petri dish also contains a suitable culture medium. A skilled practitioner will know how to select an appropriate culture medium depending on the organism to be counted. After introduction into the petri dish, the dish is incubated for a given period of time and any bacterial colonies that have formed are counted. CFU/plate ("plate count") can be converted to CFU/g or CFU/mL since the original amount of sample introduced to the petri dish is known.

In the methods disclosed herein, microbial growth can also be assessed by "turbidity" methods. When microorganisms are grown in liquid cultures, over time, they can cause the culture medium to become cloudy or "turbid." The level of cloudiness can be read by passing a light through a container holding an aliquot of the liquid culture medium. Light is scattered by the material in the aliquot of liquid culture and a turbidity meter can convert the scattering of the light to a signal that can be read by a computer or other sensor. In other aspects, turbidity methods can be used to assess the amount of non-microbial particulate matter in a liquid sample.

An "oocyst" is a spore from an apicomplexan protozoan (e.g. *Plasmodium, Cryptosporidium, Toxoplasma*, and the like). The oocyst protects the developing zygote; in some organisms, the oocyst exists for lengthy periods outside a host. In certain aspects, the oocyst is the infective stage in the protozoan life cycle.

As used herein, "residue" is a monomer within a polymeric chain, such as a monosaccharide residue in a polysaccharide. Thus, for example, chitosan is made up of GlcN and NAG residues.

"Agitation" and "agitating" as used herein refer to the shaking, stirring, vortexing, rocking, or other methods of disturbing a vessel containing a solution or suspension, in order to ensure thorough mixing of components. In some aspects, agitation may prevent the settling of components of a solution or suspension. Agitation may be continuous or may occur for brief periods of time followed by periods of rest.

"Flocculation" refers to the process wherein a suspended material falls out of a suspension. The suspended material may then be removed by a technique known in the art such as, for example, filtration, decantation, sedimentation, centrifugation, or another technique. The suspended material is referred to as "flocs," "flakes," or "floccules." A "flocculant" or "clarifying agent" is a chemical compound that can be added to a suspension to aid in the formation of floccules.

"Sedimentation" as used herein is one method for the separation of floccules from a suspension. In sedimentation, a reservoir of liquid is kept largely still, allowing gravity to act on floccules. The floccules then settle at the bottom of the reservoir of liquid. In some aspects, the liquid is removed from the settled solids. In other aspects, mechanical means are used to continuously remove settled solids.

As used herein, "decantation" is a process for separating a sedimented or precipitated solid from an overlaying layer of liquid. Decantation can be performed by simple pouring from any flask or vessel, or a special vessel ("decanter") can be used. A solution or suspension can optionally be centrifuged to pellet solid materials prior to decantation.

As used herein, "precipitation" is a process in which a chemical is added to a solution. This chemical reacts with a component of the solution, causing a solid ("precipitate") to form. The precipitate can form a suspension in the carrying liquid, or, if of sufficient size and density, can settle to the bottom of the container that holds the solution, where it can then be removed by a technique such as filtration, decantation, or the like.

A "jar test" as used herein is a method for assessing multiple water treatment regimens in parallel. A jar test can be performed by obtaining multiple identical vessels ("jars") and filling them with aliquots of water from the same source. A species such as a flocculant can then be added to each jar. In one aspect, different amounts of the same flocculant can be added to each jar to determine the optimum dosage. In another aspect, the jars are vigorously stirred or otherwise agitated to aid in dispersal of the flocculant and formation of floccules. In a further aspect, quality of the water in the jars is assessed after a set period of agitation.

References in the specification and concluding claims to parts by weight, of a particular element or component in a composition or article, denote the weight relationship between the element or component and any other elements or components in the composition or article for which a part by weight is expressed. Thus, in a compound containing 2 parts by weight of component X and 5 parts by weight of component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within the ranges as if each numerical value and sub-range is explicitly recited. As an illustration, a numerical range of "about 1 to 5" should be interpreted to include not only the explicitly-recited values of about 1 to about 5, but also to include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually. The same principle applies to ranges reciting only one numerical value as a minimum or a maximum. Furthermore, such an interpretation should apply regardless of the breadth of the range or the characteristics being described.

Disclosed are materials and components that can be used for, can be used in conjunction with, can be used in preparation for, or are products of the disclosed compositions and methods. These and other materials are disclosed herein, and it is understood that when combinations, subsets, interactions, groups, etc. of those materials are disclosed that while specific reference of each various individual and collective combination and permutation of these compounds may not be explicitly disclosed, each is specifically contemplated and described herein. For example, if a polysaccharide is disclosed and discussed and a number of different sources of gallium ions are discussed, each and every combination and permutation of polysaccharide and gallium salt that is possible is specifically contemplated unless specifically indicated to the contrary. For example, if a class of molecules A, B, and C is disclosed as well as a class of molecules D, E, and F and an example of a combination molecule A-D is disclosed, then even if each is not individually recited, each is individually and collectively contemplated. Thus, in this example, each of the combinations A-E, A-F, B-D, B-E, B-F, C-D, C-E, and C-F is specifically contemplated and should be considered disclosed from disclosure of A, B, and C; D, E, and F; and the example combination A-D. Likewise, any subset or combination of these is also specifically contemplated and disclosed. Thus, for example, the sub-group of A-E, B-F and C-E is specifically contemplated and should be considered disclosed from disclosure of A, B, and C; D, E, and F; and the example combination A-D. This concept applies to all aspects of this disclosure including, but not limited to, steps in methods of making and using the disclosed compositions. Thus, if there are a variety of additional steps that can be performed, it is understood that each of these additional steps can be performed with any specific embodiment or combination of embodiments of the disclosed methods, and that each such combination is specifically contemplated and should be considered disclosed.

Described herein are compounds and compositions useful for removing contaminants from water, as well as methods for making and using the compounds and compositions. Each component used in the compositions and methods described herein are provided below.

I. Polysaccharide

The methods described herein involve contacting water with a polysaccharide. As used herein, a "polysaccharide" is a polymer composed of covalently-linked monosaccharides. The monosaccharides in the polysaccharide can be identical, or the polysaccharide can be composed of a mixture of monosaccharide units. The polysaccharide can be natural or synthetic, or can be a natural polysaccharide that has been chemically modified. "Polysaccharide" as used herein also includes mixtures of two or more polysaccharides.

In one aspect, the polysaccharide includes, for example, chitosan, glucosamine (GlcN), N-acetyl-D-glucosamine (NAG), or any combination thereof. In one aspect, the polysaccharide is chitosan that is acetylated to a specific degree of acetylation in order to enhance flocculation, precipitation, and sedimentation of water contaminants. In one aspect, the chitosan is from about 60% to about 100% acetylated, from about 70% to about 90% acetylated, from about 70% to about 80% acetylated, or about 80% acetylated. In another aspect, the chitosan useful herein is extracted from arthropod or crustacean shells, fungi, and/or microorganisms using techniques known in the art. In one aspect, the chitosan is extracted from crab shells. In another aspect, the chitosan is extracted from shrimp shells. Exemplary procedures for producing and isolating the chitosan are provided in the Examples.

The molecular weight of the chitosan can vary. For example, the chitosan can comprise about 3, 4, 5, 6, 7, 8, 9, 10, 11, 12, 13, 14, 15, 16, 17, 18, 19, 20, or any range thereof GlcN and/or NAG units. In another aspect, the chitosan can include 5 to 7 GlcN and/or NAG units.

In one aspect, the chitosan is added to water that contains contaminants. In one aspect, the chitosan is from 0.0001 to 0.5 weight percent of the water to be treated. In another aspect, the chitosan can be added to the water in different concentrations such as, for example, 0.0001%, 0.0005%, 0.001%, 0.002%, 0.005%, 0.01%, 0.02%, 0.05%, 0.1%, 0.2%, 0.5%, or any range thereof by weight with respect to the water to be treated.

II. Source of Gallium Ions

The methods described herein involve contacting water with a source of gallium ions. As used herein, a "source of gallium ions" is any gallium compound when introduced to water produces $Ga^{+3}$ ions.

In one aspect, the source of gallium ions is introduced to the water by dissolving a gallium salt in the water. In another aspect, the source of gallium ions is a gallium compound with a counterion ion composed of one or more nitrogen atoms. An example of such a compound is $Ga(NO_3)_3$.

In one aspect, the source of gallium ions is from 0.0001 to 0.5 weight percent of the water to be treated. In another aspect, the source of gallium ions can be added to the water in different concentrations such as, for example, 0.0001%, 0.0005%, 0.001%, 0.002%, 0.005%, 0.01%, 0.02%, 0.05%, 0.1%, 0.2%, 0.5%, or any range thereof by weight with respect to the water. It should be noted that gallium and gallium (III) ions are generally recognized as having low toxicity or as being nontoxic to humans and animals.

III. Water Treatment

In certain aspects, the water to be treated is wastewater as defined above. Wastewater can include, for example, drill water, frac water, bilge water, sewage, water used in industrial processes, agricultural runoff, mine tailings, municipal wastewater, or any other source of water that contains contaminants resulting from human activities (including agricultural practices such as animal husbandry and meat processing). In other aspects, the water is well water or is from a municipal water supply.

The water is treated by contacting the water with a source of gallium ions and a polysaccharide. In one aspect, the water is first contacted with the source of gallium ions and then contacted with a polysaccharide. In another aspect, the water is first contacted with a polysaccharide and then contacted with the source of gallium ions. In yet another aspect, the water to be treated is contacted simultaneously with a polysaccharide and a source of gallium ions.

In one aspect, the polysaccharide and the source of gallium ions are dissolved separately in different containers. In one aspect, a kit includes
(a) a first composition comprising a polysaccharide and water; and
(b) a second composition comprising a source of gallium ions and water.

In another aspect, the polysaccharide and source of gallium ions are admixed prior to being dissolved in a solvent. In another aspect, the source of gallium ions and the polysaccharide are separately dissolved in a solvent and then admixed. In these aspects, the polysaccharide and source of gallium ions are in one composition. In some aspects, the solvent is water. In other aspects, a co-solvent such as glacial acetic acid is present. Here, the glacial acetic acid is from the chitosan composition. The use of additional acids such as, for example, nitric acid, are not required. Thus, in one aspect, the compositions composed of the gallium salt (e.g., gallium nitrate) and chitosan do not require the addition of nitric acid or other acids for them to be used in combination with one another.

In certain aspects, the source of gallium ions, polysaccharide, and water to be treated are admixed to form a composition. In these aspects, the composition is agitated by a method known in the art such as, for example, shaking, stirring, vortexing, rocking, or another method. In some aspects, the agitation occurs in two steps.

In one aspect, the first agitation step involves shaking, and the shaking is carried out at 10, 20, 40, 60, 80, 100, 120, 150, 300, 400, 500 rpm, or any range thereof. In this aspect, the first agitation step lasts from 1 minute to 10 minutes.

In another aspect, the second agitation step immediately follows the first agitation step. In some aspects, the second agitation step also involves shaking, and the shaking is carried out at 10, 20, 30, 40, 50, 60, 80 rpm, or any range thereof. In these aspects, the second agitation step lasts from 10 minutes to 30 minutes.

In a further aspect, a flocculation and/or precipitation step follows one or both of the agitation steps. In this aspect, the composition containing water to be treated, the source of gallium ions, and polysaccharide is left still for 1, 2, 5, 10, 15, 20, 30, 60, 120, or any range thereof minutes during which time floccules or precipitates settle on the bottom of the container as a result of the action of gravity.

In one aspect, the first agitation step involves shaking at 100 rpm for 2 minutes, the second agitation step involves shaking at 40 rpm for 20 minutes, and the precipitation and/or flocculation step is carried out for 20 minutes.

In another aspect, filtration, sedimentation, centrifugation, decantation, or another method can optionally be used to remove precipitates or floccules from the treated water.

In some aspects, the pH of any solution or composition at any stage of the treatment process can be adjusted. In one aspect, the pH of the composition containing the source of gallium ions, polysaccharide, and water to be treated is adjusted in order to optimize the removal of contaminants from the water. In one aspect, the pH of the composition containing the source of gallium ions, polysaccharide, and water to be treated is adjusted to 2, 2.5, 3, 3.5, 4, 4.5, 5, 5.5, 7, 8, or 9, or any range thereof using buffers, acids, bases, or other compounds known in the art. In another aspect, the pH of the water to be treated is from 2 to 5, 2 to 4, 3 to 4, or about 3.5. In one aspect, the pH of the chitosan composition is from 4.5 to 5. Subsequently, the gallium ion composition is added to the chitosan composition, and the pH of the final solution is adjusted to 5.5 to 6. The pH of the water to be treated does not need to be adjusted when using the compositions described herein.

The compositions and methods described herein can be used in batch or a continuous system. Exemplary procedures for the batch removal of contaminants from water are provided in the Examples. In the case of a continuous contaminant removal, the polysaccharide and source of gallium ions (together as one composition or separately) can be injected into a line containing the water to be treated. The treated water can be subsequently processed (e.g., filtered, treated with another water purification technique, etc.).

In certain aspects, the compounds, compositions, and methods disclosed herein are effective in removing at least one contaminant from water. The degree of contaminant removal can vary. In one aspect, the compositions and methods described herein can remove from 50% to 100% of one or more contaminants.

In one aspect, the compositions and methods described herein can useful in physically removing a contaminant from water. For example, the compositions described herein can be added to water, and a precipitate is subsequently formed that can be readily removed from the water. In one aspect, the metal compounds such as oxides of copper, zinc, aluminum, and iron can be removed from the water to treated using the compositions and methods described herein.

In another aspect, the compositions and methods described herein can useful in removing one or more microbial species in the water. The phrase "removing one or more microbial species in the water" includes the killing of the species in the water and/or the physical removal of the species from the water (dead or alive). In one aspect, the microbial species can be fungi, algae, bacteria, protozoa, archaea, viruses, water parasites (e.g., genus of Plasmodium that cause malaria) or combinations thereof. In certain aspects, the microbial species are pathogenic to humans or animals.

In one aspect, fungi are removed from water using the compounds, compositions, and methods disclosed herein. In a further aspect, the fungi are selected from the genera *Candida, Aspergillus, Cryptococcus, Histoplasma, Pneumocystis, Stachybotrys*, or a combination thereof.

In another aspect, algae are removed from water using the compounds, compositions, and methods disclosed herein. In a further aspect, the algae are selected from the genera *Pseudochattonella, Vicicitus, Chattonella, Fibrocapsa, Het-*

*erosigma, Dinophysis, Phalacroma, Alexandrium, Coolia, Gambierdiscus, Gessnerium, Gonyaulax, Lingulodinium, Ostreopsis, Pyrodinium, Amphidinium, Cochlodinium, Gymnodium, Karenia, Karlodinium, Takayama, Azadinium, Heterocapsa, Pfiesteria, Protoperidinium, Pseudopfiesteria, Procentrum, Chrysochromulina, Phaeocystis, Prymnesium, Halamphora, Nitzschia, Pseudonitzschia*, or a combination thereof.

In still another aspect, protozoa are removed from water using the compounds, compositions, and methods disclosed herein. In a further aspect, the protozoa are selected from the genera *Entamoeba, Giardia, Cryptosporidium, Trichomonas, Toxoplasma, Plasmodium, Acanthamoeba, Dientamoeba, Naegleria, Balamuthia, Balantidium, Trypanosoma*, an oocyst thereof, or a combination thereof.

In yet another aspect, viruses are removed from water using the compounds, compositions, and methods disclosed herein. In a further aspect, the viruses are selected from the families Adenoviridae, Herpesviridae, Papillomaviridae, Polyomaviridae, Poxviridae, Hepadnaviridae, Parvoviridae, Astroviridae, Caliciviridae, Picornaviridae, Coroniviridae, Flaviviridae, Togaviridae, Retroviridae, Orthomyxoviridae, Arenaviridae, Bunyaviridae, Filoviridae, Paramyxoviridae, Rhabdoviridae, Reoviridae, or a combination thereof.

In still another aspect, bacteria are removed from water using the compounds, compositions, and methods disclosed herein. In one aspect, the bacteria are Gram-positive bacteria and are selected from the genera *Clostridium, Corynebacterium, Enterococcus, Listeria, Staphylococcus, Streptococcus*, or a combination thereof. In another aspect, the bacteria are Gram-negative bacteria and are selected from the genera *Bordetella, Borrelia, Brucella, Campylobacter, Citrobacter, Enterobacter, Escherichia, Francisella, Haemophilus, Hafnia, Helicobacter, Klebsiella, Legionella, Leptospira, Neisseria, Pseudomonas, Rickettsia, Salmonella, Serratia, Shigella, Treponema, Vibrio, Yersinia*, or a combination thereof. In one aspect, the Gram-negative bacteria are coliform bacteria. In a further aspect, the Gram-negative bacteria are fecal coliform bacteria. In a still further aspect, the fecal coliform bacteria are *Escherichia coli*. In another aspect, the bacteria are non-Gram-staining bacteria and are selected from the genera *Chlamydia, Chlamydophila, Mycobacterium, Mycoplasma*, or a combination thereof.

In certain aspects, the compounds, compositions, and methods disclosed herein can optionally be used in conjunction with one or more additional water purification techniques. These techniques can include, for example, chlorination, aeration, coagulation, flocculation, sedimentation, filtration, decantation, desalination, boiling, autoclaving, distillation, UV irradiation, X-ray irradiation, ion exchange, reverse osmosis, ozonation, Fenton or photo-Fenton oxidation of organic compounds, iron precipitation, treatment with peroxides, or a combination thereof. In one aspect, the water to be treated herein can first be treated with the methods disclosed herein and then be treated using another technique. In an alternative aspect, the water to be treated herein can first be treated using one or more other techniques and can then be treated by the methods disclosed herein.

In some aspects, aliquots of water at various stages of treatment by the compounds, compositions, and methods disclosed herein can be assessed for bacterial growth. In one aspect, aliquots are withdrawn, mixed with a suitable media and agar, and plated in petri dishes. In these aspects, after some period of incubation, plate counts are performed and the numbers of colony forming units (CFUs) in the aliquots are calculated. In a further aspect, the aliquots for various treatment schemes may need to be diluted prior to plating to assess bacterial growth. Methods for aliquotting, plating, and dilution are known in the art and can be accomplished by a practitioner having ordinary skill in the art using only reasonable and routine experimentation.

In other aspects, the aliquots are maintained in liquid culture and microbial growth is estimated by measuring the turbidity of the liquid culture solutions after a given time interval.

In one aspect, the compounds, compositions, and methods disclosed herein are used to treat wastewater prior to discharging it into the environment. In another aspect, the compounds, compositions, and methods disclosed herein are used to treat water, such as, for example, a municipal water supply, or well water, before it is used by humans or domestic animals.

EXAMPLES

The following examples are put forth so as to provide those of ordinary skill in the art with a complete disclosure and description of how the compounds, compositions, and methods described and claimed herein are made and evaluated, and are intended to be purely exemplary and are not intended to limit the scope of what the inventors regard as their invention. Efforts have been made to ensure accuracy with respect to numbers (e.g., amounts, temperatures, etc.), but some errors and deviations should be accounted for. Unless indicated otherwise, parts are parts by weight, temperature is in ° C. or is at ambient temperature, and pressure is at or near atmospheric. Numerous variations and combinations of reaction conditions, e.g., component concentrations, desired solvents, solvent mixtures, temperatures, pressures, and other reaction ranges and conditions can be used to optimize the product purity and yield obtained from the described process. Only reasonable and routine experimentation will be required to optimize such processes and conditions.

Example 1

Preparation of Chitosan

Shrimp shells were subjected to a process of washing and drying in an oven and they were milled so that smaller particle size is obtained. Once the shrimp shells are in the form of powder, the powder was subjected to deproteinization using sodium hydroxide 10% w/v in a ratio of 1/5 per volume with an electric shaker (250 RPM). After two hours at a temperature of 80° C., the powder was filtered, washed with water, then the deproteinization process repeated with 10% NaOH.

Once deproteinized, the product was washed with water until neutral. Then product was treated with hydrochloric acid 5% v/v (ratio of 1/5 per volume product to acid) and stirred for two hours at 250 rpm at room temperature. The product was washed, and the process above was repeated with HCl. The product was washed with water to remove any residual acid.

The neutralized product was dried for 18 hours in an oven at 100° C. up to 3% humidity and a 20% performance compound 1. The dried product was subjected to deacetylation using a solution of NaOH 50% with vigorous stirring at 250 rpm for 4 hours at a temperature of 100° C. The ratio of product to NaOH was 1/8 weight to volume. The NaOH solution was removed and the solid washed to remove any base. The product was dried resulting in a performance of 65% with respect to Compound 1. The final chitosan product had a moisture percentage of 1%.

Example 2

Protocol for Water Treatment

Solutions of gallium nitrate and chitosan at different ratios were transferred into sterilized media bottles (100 mL or 1 L). After 5 min, enough waste water was added to fill the bottles to their respective maximum volume marks. These mixtures were then shaken at 1000 rpm at room temperature.

During shaking, aliquots were removed from the treatment samples. Aliquots were diluted and transferred to agar plates using standard microbiology methods and protocols such as dilution plating, pour plating, and surface inoculation. ChromoCult® selective media was used in conjunction with the agar to determine E. coli (dark-blue to violet colonies after incubation) and total coliform (salmon to red colonies after incubation) levels, following instructions provided by the manufacturer. Agar/ChromoCult® cultures were incubated at 37° C. for 24 h.

Numbers of colony forming units (CFUs) were read from the plates after incubation and were used to determine disinfection percentage for each treatment.

Example 3

Jar Testing Protocol

Jar testing was used to simultaneously compare multiple conditions for waste water treatment. A working volume of 2 L was used during each jar testing experiment. Different ratios of gallium to chitosan were evaluated. Further, different shaking regimes and sedimentation/precipitation times were evaluated. For the initial shake, 10, 20, 40, 60, 80, 100, 120, 150, 300, 400, and 500 rpm values were tested. For the second shake, 10, 20, 30, 40, 50, 60, and 80 rpm values were tested. Sedimentation/precipitation values tested included 1, 2, 5, 10, 15, 20, 30, 60, and 120 min Optimum values for each parameter were selected from those listed above and further experiments were carried out using these optimum values.

Mixtures of treatments to waste water were subjected to a fast shake (100 rpm) for 2 min, followed by a slower shake (40 rpm) for 20 minutes, followed by a final sedimentation or precipitation step of 20 min. Further to these steps, turbidity was measured using a HANNA turbidity meter, following the manufacturer's instructions.

Example 4

Experimental Treatments

Treatments tested following the procedure of Examples 2 and 3 included gallium alone, chitosan alone, and combinations of gallium and chitosan, as well as various controls. Different concentrations of both gallium and chitosan were tested. Gallium (III) nitrate was purchased from Aldrich and used as the gallium source.

Optimization of solution pH for disinfection and flocculation was also performed. The following pH values were tested: 2, 2.5, 3, 3.5, 4, 4.5, 5, 5.5, 7, 8, and 9. It was determined that pH 3.5 was the optimum value for the chitosan+gallium compositions.

The performance of various chitosan solutions was also tested. Chitosan was sourced from the exoskeletons (shells) of shrimp or of crabs; chitosan from shrimp exoskeletons performed best. Different degrees of deacetylation of chitosan were also compared, including 20% deacetylated (80% acetylated) and 30% deacetylated (70% acetylated) chitosan. 20% deacetylated chitosan exhibited superior results.

Treatment times were also optimized. Samples were taken at 5, 10, 15, and 30 min, as well as at 24, 48, and 72 h.

Example 5

Results of Wastewater Disinfection Tests

Bacterial populations (expressed in terms of CFUs) for selected water treatments are presented in Table 1. The data shows that the combination chitosan+gallium is more effective than gallium alone or chitosan alone in disinfecting waste water. The combination chitosan/gallium disinfected the wastewater in 30 minutes, while chitosan alone took 24 hours for total disinfection. Gallium alone did not show any disinfection properties. Likewise, the combination chitosan/gallium showed better flocculation (98%) than gallium alone (90%) and chitosan alone (62%) within the time required to show clear flocculation (42-48 minutes).

Comparative effect between Gallium alone or chitosan alone, and the effect of the comparison between Gallium + Chitosan on wastewater disinfection

| TREATMENT | Bacterial Population - Treatment Exposure time CFU - (Mean ± SD) | | | | | | |
|---|---|---|---|---|---|---|---|
| | 5 min | 10 min | 15 min | 30 min | 24 H | 48 H | 72 H |
| Gallium 0.05% + Chitosan 0.1% | 4.6E+4 ± 0 | 9.3E+3 ± 5.7 | 3.9E+3 ± 0 | 0 | 0 | 0 | 0 |
| Gallium 0.05% | PCC | PCC | PCC | PCC | PCC | PCC | PCC |
| Chitosan 0.1% | 6.8E+4 ± 0 | 2.68E+4 ± 5.7 | 1.39E+4 ± 5.7 | 2.12E+3 ± 2.3 | 0 | 0 | 0 |
| CONTROL (Untreated waste water) | PCC | PCC | PCC | PCC | PCC | PCC | PCC |

PCC: Plate Complete Cover

CFU: Colony forming unit/mL

SD: Standard deviation.

Throughout this application, various publications are referenced. The disclosures of these publications in their entireties are hereby incorporated by reference into this application in order to more fully describe the compounds, compositions, and methods described herein.

Various modifications and variations can be made to the compounds, compositions, and methods described herein. Other aspects of the compounds, compositions, and methods described herein will be apparent from consideration of the specification and practice of the compounds, compositions, and methods disclosed herein. It is intended that the specification and examples be considered as exemplary.

What is claimed:

1. A method for removing a contaminant from water to be treated comprising (a) contacting the water to be treated with a composition comprising (1) chitosan, wherein the chitosan has a total of 3 to 20 GlcN and/or NAG units and is from 60% to 100% acetylated, and (2) a source of gallium ions to produce a first composition, and wherein the chitosan is in the amount of from 0.05 to 0.2 weight percent of the water to be treated.

2. The method of claim 1, wherein the chitosan is from 70% to 80% acetylated.

3. The method of claim 1, wherein the chitosan has a total of 5 to 7 GlcN and/or NAG units.

4. The method of claim 1, wherein prior to step (a), adjusting the pH of the water to 2 to 5.

5. The method of claim 1, wherein the source of gallium ions is from 0.001 to 0.05 weight percent of the water to be treated.

6. The method of claim 1, wherein the source of gallium ions is $Ga(NO_3)_3$ in the amount of 0.001 to 0.1 weight percent of the water to be treated.

7. The method of claim 1, further comprising (b) agitating the first composition and (c) separating solid materials from the first composition.

8. The method of claim 1, wherein the method removes at least one microbial species from water.

9. The method of claim 8, wherein the microbial species comprises a fungus, alga, bacterium, protozoan, archaeaon, virus, or any combination thereof.

10. The method of claim 1, wherein the water is wastewater, well water, or a municipal water supply.

11. The method of claim 1, wherein prior to step (a) treating the water with at least one additional water purification technique.

12. The method of claim 11, wherein the additional water purification technique comprises chlorination, aeration, coagulation, flocculation, sedimentation, filtration, decantation, desalination, boiling, autoclaving, distillation, UV irradiation, X-ray irradiation, ion exchange, reverse osmosis, ozonation, Fenton or photo-Fenton oxidation of organic contaminants, iron precipitation, treatment with peroxides, or any combination thereof.

13. The method of claim 1, wherein after step (a) treating the first composition with at least one additional water purification technique.

14. The method of claim 13, wherein the additional water purification technique comprises chlorination, aeration, coagulation, flocculation, sedimentation, filtration, decantation, desalination, boiling, autoclaving, distillation, UV irradiation, X-ray irradiation, ion exchange, reverse osmosis, ozonation, Fenton or photo-Fenton oxidation of organic contaminants, iron precipitation, treatment with peroxides, or any combination thereof.

15. The method of claim 1, wherein the chitosan has a total 3 to 10 GlcN and/or NAG units and is from 70% to 90% acetylated.

16. The method of claim 1, wherein the first composition has a pH less than or equal to 5.5.

17. The method of claim 1, wherein the water to be treated has a pH less than or equal to 5.5.

* * * * *